(12) United States Patent
Hong et al.

(10) Patent No.: US 8,872,734 B2
(45) Date of Patent: *Oct. 28, 2014

(54) SYSTEM AND METHOD FOR SWITCHING TWO-DIMENSIONAL (2D) AND THREE-DIMENSIONAL (3D) DISPLAY MODES

(71) Applicant: SuperD Co. Ltd., Shenzhen (CN)

(72) Inventors: Xu Hong, Shenzhen (CN); Hongwei Quan, Shenzhen (CN); Xiaoda Gong, Shenzhen (CN); Fuzhong Guo, Shenzhen (CN)

(73) Assignee: SuperD Co. Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/970,627

(22) Filed: Aug. 20, 2013

(65) Prior Publication Data

US 2013/0335400 A1 Dec. 19, 2013

Related U.S. Application Data

(63) Continuation-in-part of application No. 12/904,244, filed on Oct. 14, 2010, now Pat. No. 8,537,074.

(30) Foreign Application Priority Data

Jul. 1, 2010 (CN) .......................... 2010 1 0225094

(51) Int. Cl.
*G09G 5/00* (2006.01)
*G06F 3/038* (2013.01)
*G09G 3/36* (2006.01)
*G02F 1/29* (2006.01)
*G02B 27/22* (2006.01)
*H04N 13/04* (2006.01)

(52) U.S. Cl.
CPC ................ *G09G 3/3696* (2013.01); *G02F 1/29* (2013.01); *G02B 27/2271* (2013.01); *H04N 13/0404* (2013.01); *H04N 13/0452* (2013.01); *G02F 2001/291* (2013.01)
USPC .................................. 345/6; 345/204; 349/15

(58) Field of Classification Search
CPC ... G09G 3/3696; G02F 1/29; G02F 2001/291; H04N 13/0404; H04N 13/0452
USPC ......................................... 345/6, 204; 349/15
See application file for complete search history.

(56) References Cited

U.S. PATENT DOCUMENTS

| | | | |
|---|---|---|---|
| 8,537,074 B2 * | 9/2013 | Hong | 345/6 |
| 2007/0195410 A1 * | 8/2007 | Yun et al. | 359/464 |
| 2010/0073347 A1 * | 3/2010 | Takagi et al. | 345/211 |
| 2010/0157181 A1 * | 6/2010 | Takahashi | 349/33 |

* cited by examiner

*Primary Examiner* — Kevin M Nguyen
(74) *Attorney, Agent, or Firm* — Anova Law Group, PLLC

(57) ABSTRACT

A 2D/3D switching system contains a 2D/3D switching device having a display area for selectively processing lights from 2D images and 3D images. The 2D/3D switching device includes a first substrate, a plurality of first electrodes formed on the first substrate, a second substrate, a plurality of second electrodes formed on the second substrate and arranged corresponding to the plurality of first electrodes and separated with a distance, and a liquid crystal layer placed between the first substrate and the second substrate to provide the display area. A driving unit is configured to provide driving voltages to the plurality of first electrodes and the plurality of second electrodes. The driving unit applies a plurality of voltages on the first electrodes and the second electrodes to enable the liquid crystal layer to operate in one of a full-screen 2D mode, a full-screen 3D mode, and a 2D/3D mode.

13 Claims, 14 Drawing Sheets

(Prior Art)

US 8,872,734 B2

SYSTEM AND METHOD FOR SWITCHING TWO-DIMENSIONAL (2D) AND THREE-DIMENSIONAL (3D) DISPLAY MODES

CROSS-REFERENCES TO RELATED APPLICATIONS

This application is a continuation-in-part (CIP) application of U.S. patent application Ser. No. 12/904,244, filed on Oct. 14, 2010, which claims the priority of Chinese patent application number 201010225094.4, filed on Jul. 1, 2010, the entire contents of all of which are incorporated herein by reference.

FIELD OF THE INVENTION

The present invention generally relates to three-dimensional (3D) display technologies and, more particularly, to the methods and systems for switching between a two-dimensional (2D) display mode and a 3D display mode.

BACKGROUND

2D/3D display switching technology is a trend for 3D display devices. With the 2D/3D display switching technology, a 3D display device can display images in a 2D display mode or a 3D display mode upon a user's request. FIG. 1 and FIG. 2 show a conventional 2D/3D switching device. As shown in FIG. 1, a 2D/3D switching device includes a micro-lens substrate 1 and a flat substrate 2 arranged in parallel. First electrode 3 and second electrode 4 are placed on the surfaces of micro-lens substrate 1 and flat substrate 2, respectively. Further, a liquid crystal layer 5 is positioned between micro-lens substrate 1 and flat substrate 2.

As shown in FIG. 1, when the optical axis of liquid crystal molecules in liquid crystal layer 5 is parallel to flat substrate 2, incident polarized lights have a polarization direction parallel to the direction of the optical axis of the liquid crystal, and the liquid crystal molecules have a refractive index of $n_e$, and $n_e$ is not equal to the refractive index of micro-lens substrate 1, $n_p$. Thus the incident polarized lights are refracted at the surface of micro-lens substrate 1. Therefore, at this point, the 2D/3D switching device shows a lens effect and can be used to realize 3D display.

As shown in FIG. 2, when the optical axis of liquid crystal molecules is perpendicular to the flat substrate 2, the incident polarized lights have a polarization direction perpendicular to the optical axis of liquid crystal, and the liquid crystal molecules have a refractive index of $n_o$, and $n_o$ is equal to the refractive index of micro-lens substrate 1, $n_p$. Thus the incident polarized lights pass directly through micro-lens substrate 1 without refraction. Therefore, at this point, the 2D/3D switching device does not show a lens effect and can be used to realize 2D display.

Further, rotation of the long axis of liquid crystal molecules is controlled by applying driving voltages on first electrode 3 and second electrode 4 to create an electric field. The driving voltages to first electrode 3 and second electrode 4 are respectively provided by two separate voltage output modules (not shown). In conventional 2D/3D switching devices, the driving voltage provided by the voltage output module for each of the first electrode and second electrode is fixed. When the driving voltage provided by one voltage output module shifts due to design errors or other reasons, the other voltage output module cannot adjust its driving voltage accordingly, which could lead to incorrect switching behavior. In addition, because the voltage output modules can only provide fixed voltages, 3D display areas are also fixed and the user cannot change locations of the 3D display areas. Further, in the conventional 2D/3D switching devices, the liquid crystal molecules can only have two rotations angles, one for liquid crystal molecules corresponding to 2D display areas and the other for 3D display areas. Thus, when displaying different 3D contents, same 3D effect may appear, resulting in grainy images.

The disclosed methods and systems are directed to solve one or more problems set forth above and other problems.

BRIEF SUMMARY OF THE DISCLOSURE

One aspect of the present disclosure includes a 2D/3D switching system. The 2D/3D switching system includes a 2D/3D switching device for selectively processing lights from 2D images and 3D images. The 2D/3D switching device includes a plurality of first electrodes, a plurality of second electrodes arranged corresponding to the plurality of first electrodes and separated with a distance, and a liquid crystal layer placed between the plurality of first electrodes and the plurality of second electrodes. The 2D/3D switching system also includes a driving unit coupled to the plurality of first electrodes and the plurality of second electrodes to provide driving voltages to the plurality of first electrodes and the plurality of second electrodes, and to provide at least one voltage adjustment signal to adjust corresponding driving voltages of at least one of plurality of first electrodes and the plurality of second electrodes.

Another aspect of the present disclosure includes a method for a 2D/3D switching device for selectively processing lights from 2D images and 3D images. The 2D/3D switching device includes a plurality of first electrodes and a plurality of second electrodes arranged corresponding to the plurality of first electrodes and separated with a distance. The method includes providing a driving unit coupled to the plurality of first electrodes and the plurality of second electrodes, and providing driving voltages by the driving unit to the plurality of first electrodes and the plurality of second electrodes. The method also includes providing at least one voltage adjustment signal by the driving unit, and adjusting corresponding driving voltages of at least one of the plurality of first electrodes and the plurality of second electrodes based on the at least one voltage adjustment signal.

Another aspect of the present disclosure includes a 2D/3D switching system containing a 2D/3D switching device having a display area for selectively processing lights from 2D images and 3D images. The 2D/3D switching device includes a first substrate, a plurality of first electrodes formed on the first substrate, a second substrate, a plurality of second electrodes formed on the second substrate and arranged corresponding to the plurality of first electrodes and separated with a distance, and a liquid crystal layer placed between the first substrate having the plurality of first electrodes and the second substrate having the plurality of second electrodes to provide the display area. Further, it is provided a driving unit coupled to the plurality of first electrodes and the plurality of second electrodes to provide driving voltages to the plurality of first electrodes and the plurality of second electrodes. The driving unit applies a plurality of voltages on the first electrodes and the second electrodes to enable the liquid crystal layer to operate in one of a full-screen 2D mode, a full-screen 3D mode, and a 2D/3D mode.

Another aspect of the present disclosure includes a method for a 2D/3D switching device for selectively processing lights from 2D images and 3D images. The 2D/3D switching device has a first substrate, a plurality of first electrodes formed on the first substrate, a second substrate, a plurality of second electrodes formed on the second substrate and arranged corresponding to the plurality of first electrodes and separated with a distance, and a liquid crystal layer placed between the first substrate and the second substrate to provide a display area. The method includes individually providing driving voltages to the plurality of first electrodes and the plurality of second electrodes. The method also includes applying one or more voltages on the first electrodes and the second electrodes to enable the liquid crystal layer to operate in one of a full-screen 2D mode, a full-screen 3D mode, and a 2D/3D mode.

Other aspects of the present disclosure can be understood by those skilled in the art in light of the description, the claims, and the drawings of the present disclosure.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

Figure 1:
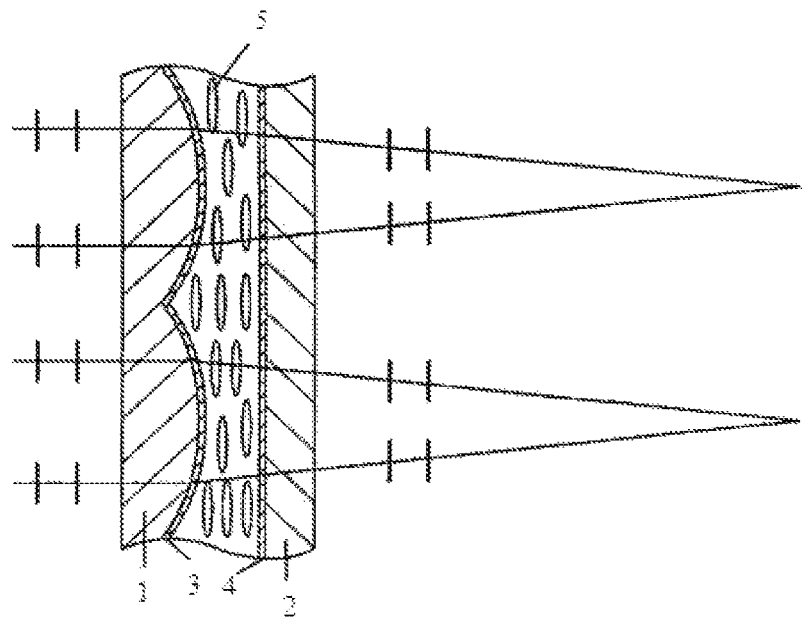
FIG. 1 illustrates a conventional 2D/3D switching device.
Figure 2:
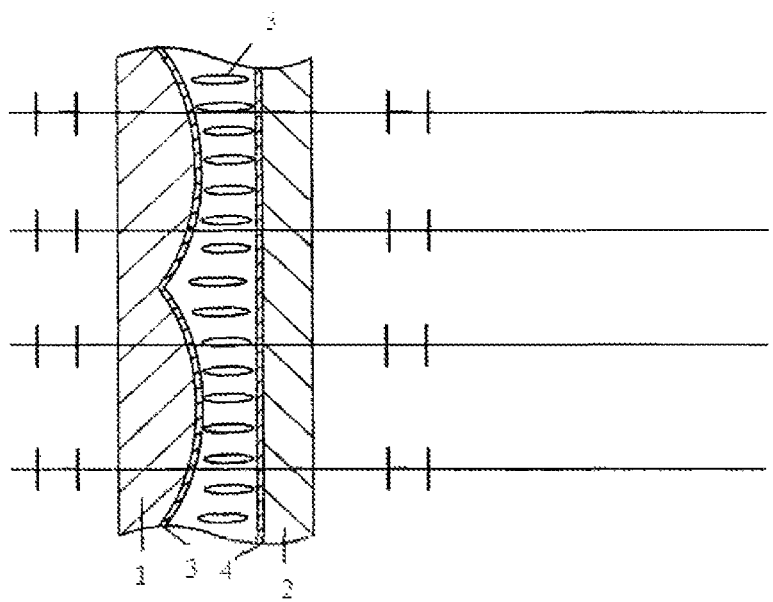
FIG. 2 illustrates a conventional 2D/3D switching device.
Figure 3:
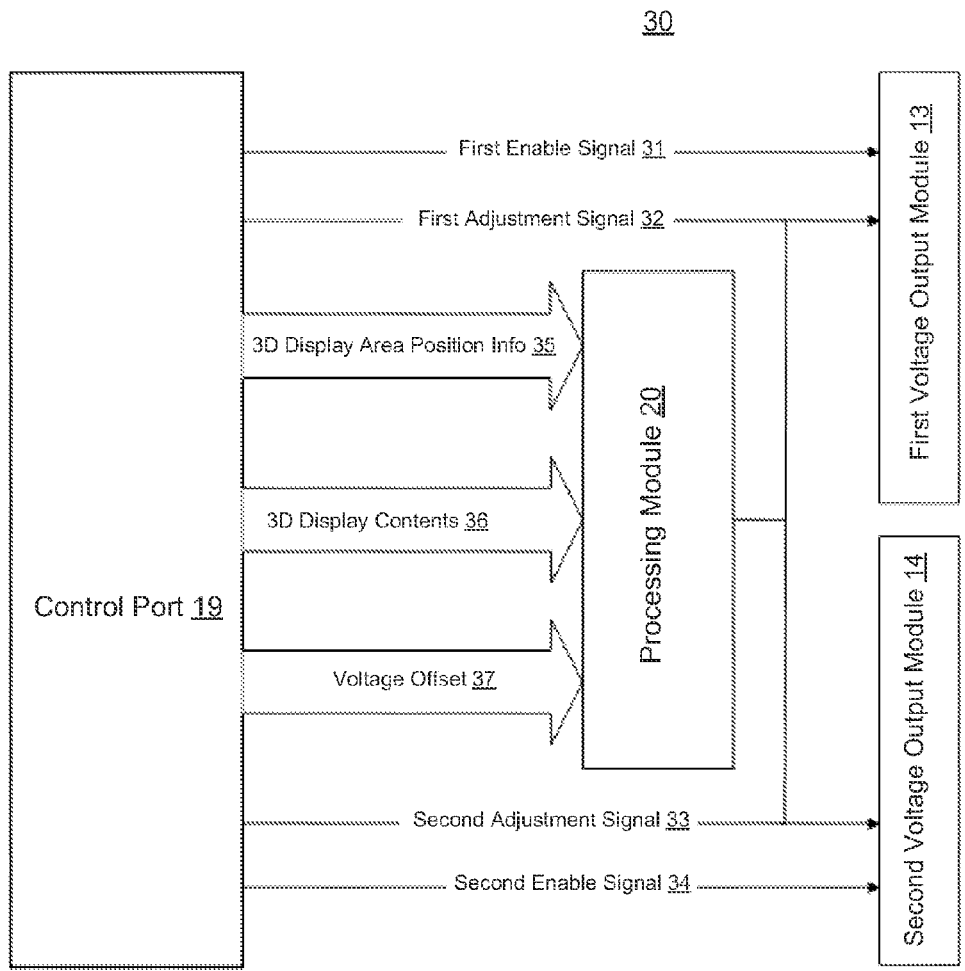
FIG. 3 illustrates a block diagram of an exemplary driving unit consistent with the disclosed embodiments.

As disclosed herein, a 2D/3D switching system generally includes a 2D/3D switching device and a driving unit for controlling and driving the 2D/3D switching device. FIG. 3 shows a block diagram of an exemplary driving unit 30 consistent with the disclosed embodiments.

As shown in FIG. 3, driving unit 30 may include a first voltage output module 13, a second voltage output module 14, a control port 19, and a processing module 20. First voltage output module 13 and second voltage output module 14 may include any appropriate driving circuitry to provide one or more voltages to a 2D/3D switching device. First voltage output module 13 and second voltage output module 14 may be enabled by first enable signal 31 and second enable signal 34. Further, voltages from first voltage output module 13 and second voltage output module 14 may also be adjusted by first adjustment signal 32 and second adjustment signal 33, respectively.

Control port 19 may include any appropriate device capable of interfacing with certain external systems or devices to receive certain signals. For example, control port 19 may be interfacing with a 3D display device, such as a computer, a television set, a smart phone, or a consumer electronic device. Through control port 19, the 3D display device may send first enable signal 31 to first voltage output module 13 to enable first voltage output module 13, and may also send second enable signal 34 to second voltage output module 14 to enable second voltage output module 14. The 3D display device may also send first adjustment signal 32 and second adjustment signal 33 to first voltage output module 13 and second voltage output module 14, respectively, to adjust output voltages dynamically.

Further, the 3D display device may also send 3D display area position information 35, 3D display contents 36, and voltage offset 37 to processing module 20 for further processing. Processing module 20 may include any appropriate device capable of processing received information and providing control signals to first voltage output module 13 and second voltage output module 14. For example, processing module 20 may include a processor such as a graphic processing unit (GPU), general purpose microprocessor, digital signal processor (DSP) or microcontroller, and application specific integrated circuit (ASIC). Processing module 20 may also include other devices such as memory devices, communication devices, input/output devices, driving circuitry, and storage devices, etc. Further, processing module 20, or the processor of processing module 20, may execute sequences of computer program instructions to perform various processes associated with driving unit 30.

Figure 4:
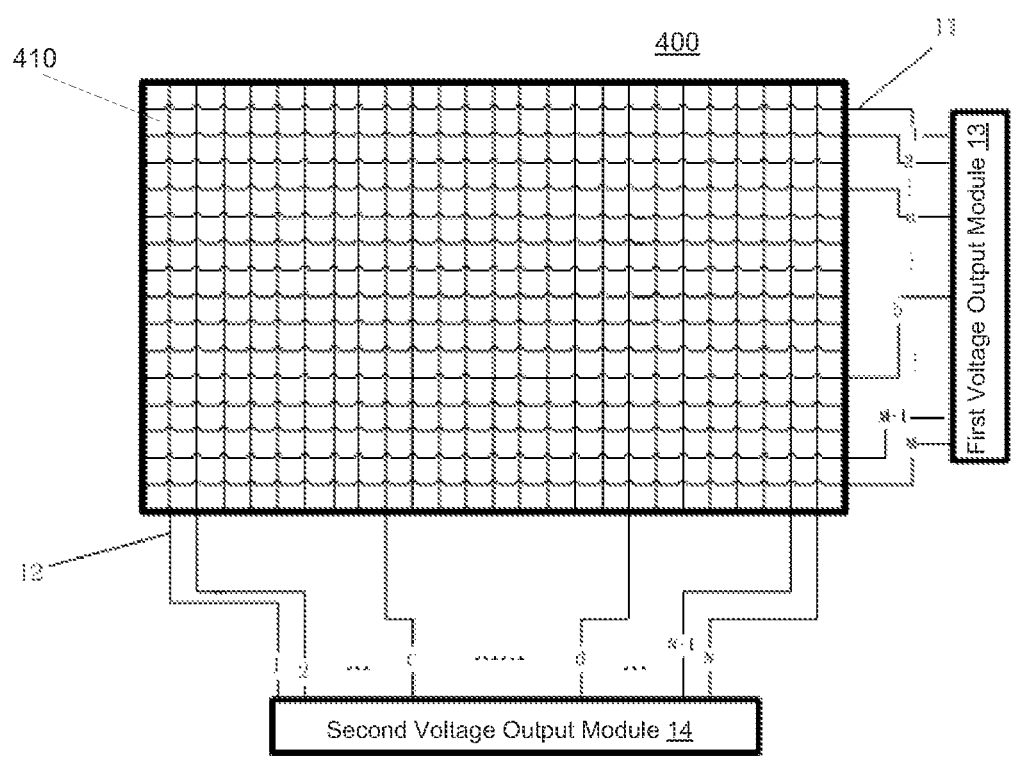
FIG. 4 illustrates a block diagram of an exemplary 2D/3D switching system consistent with the disclosed embodiments.

During operation, driving unit 30 provides driving voltages to 2D/3D switching device(s), either the external 3D display device or processing module 20 or both may generate voltage adjustment signals (i.e., first adjustment signal 32 and second adjustment signal 33) to adjust first voltage output module 13 and/or second voltage output module 14. FIG. 4 shows an exemplary 2D/3D switching system 400.

As shown in FIG. 4, 2D/3D switching system 400 may include a 2D/3D switching device 410 and driving unit 30 (e.g., first voltage output module 13 and second voltage output module 14). 2D/3D switching device 410 includes first electrodes 11 and second electrodes 12. A liquid crystal layer (not shown) is placed between first electrodes 11 and second electrodes 12. Other components may also be included.

First voltage output module 13 is coupled to first electrodes 11 of 2D/3D switching device 410. First electrodes 11 include a plurality of first electrodes 1, 2, . . . , M−1, M, arranged in parallel with a certain distance, where M is an integer. First electrode a and first electrode b are exemplary first electrodes. Further, second voltage output module 14 is coupled to second electrodes 12 of 2D/3D switching device 410. Second electrodes 12 include a plurality of second electrodes 1, 2, . .

. . , N−1, N, arranged in parallel with a certain distance, where N is an integer. Second electrode c and second electrode d are exemplary second electrodes.

The M number of first electrodes 11 and the N number of second electrodes 12 may be positioned perpendicular to each other (i.e., crossing each other) to form electric fields. Other arrangement may also be used. Liquid crystal molecules of the liquid crystal layer may be controlled by electric fields generated between first electrodes 11 and second electrodes 12 to achieve 2D and 3D display effects by rotating the long axis with different degrees.

First electrodes 11 and second electrodes 12 may include any appropriate types of electrodes. For example, as shown in FIG. 4, first electrodes 11 and second electrodes 12 are strip electrodes arranged in a crossing arrangement. Other arrangements may also be used. In certain other embodiments, first electrodes 11 may include a plurality of driving electrodes while second electrodes 12 may include a common electrode.

In operation, first voltage output module 13 provides voltages to the plurality of first electrodes 11 under the control of first enable signal 31, and second voltage output module 14 provides voltages to the plurality of second electrodes 12 under the control of second enable signal 34. Further, first voltage output module 13 may receive first adjustment signal 32 to dynamically adjust output voltages to first electrodes 11, and second voltage output module 14 may receive second adjustment signal 33 to dynamically adjust output voltages to second electrodes 12.

For example, output voltages of first voltage output module 13 and/or second voltage output module 14 may be monitored, and the values of the output voltages may be compared with one or more predetermined or standard voltages to determine whether the output voltages have been shifted during operation. If a shifted value is beyond a permitted range, incorrect switching may occur. Processing module 20 of driving unit 30 or the 3D display device controlling driving unit 30 may calculate a voltage offset 37 and may generate first adjustment signal 32 and/or second adjustment signal 33 to first voltage output module 13 and/or second voltage output module 14 to adjust the output voltages such that proper output voltages are provided to first electrodes 11 and/or second electrodes 12.

Figure 5:
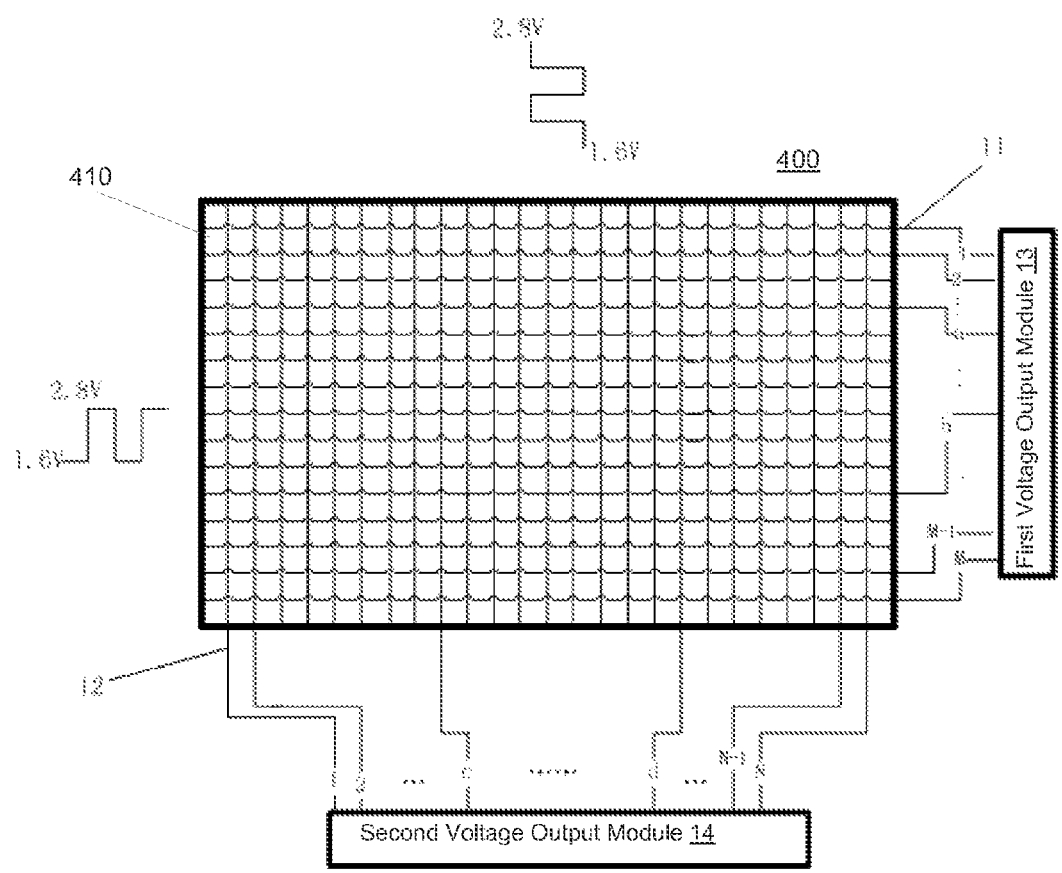
FIG. 5 illustrates an exemplary operation consistent with the disclosed embodiments.

FIG. 5 shows an exemplary operation consistent with the disclosed embodiments. The 3D display device displays only 2D images on an entire display screen, and thus may control driving unit 30 to set 2D/3D switching device 410 for only 2D display. As shown in FIG. 5, first voltage output module 13 may provide a first driving voltage to each of first electrodes 11, and the amplitude of the first driving voltage may have a first value (e.g., 1.6V) and a second value (e.g., 2.8V). The amplitude of the first driving voltage may change between the first value and the second value according a certain pattern, such as a pulse pattern as shown in FIG. 6.

Further, second voltage output module 14 may provide a second driving voltage to each of second electrodes 12, and the amplitude of the second driving voltage may have a first value (e.g., 1.6V) and a second voltage (e.g., 2.8V). The amplitude of the second driving voltage may change between the first value and the second value corresponding to the pattern of first voltage output module 13 (e.g., a pulse pattern). For example, when the first driving voltage is 1.6V, the second driving voltage is set to 2.8V; when the first driving voltage is 2.8V, the second driving voltage is set to 1.6V. Thus, a voltage difference between first electrodes 11 and second electrodes 12 can be always kept at ±1.2V. Therefore, the liquid crystal molecules in the 2D/3D switching device only have a first rotation angle such that a 2D display mode is provided and only 2D images can be display on the entire display screen.

The first driving voltage, the second driving voltage, and the voltage difference between the first driving voltage and the second driving voltage in the 2D display mode may be monitored. If one or both of the first driving voltage and the second driving voltage have a voltage value that is beyond a predetermined range, first adjustment signal 32 and/or second adjustment signal 33 may be provided to adjust the voltage values of the first driving voltage and the second driving voltage. Further, if one of the first driving voltage and the second driving voltage is shifted such that the voltage difference is out of an operation range, the other one of the first driving voltage and the second driving voltage may be adjusted such that the voltage difference is maintained within the operation range for 2D display.

Figure 6:
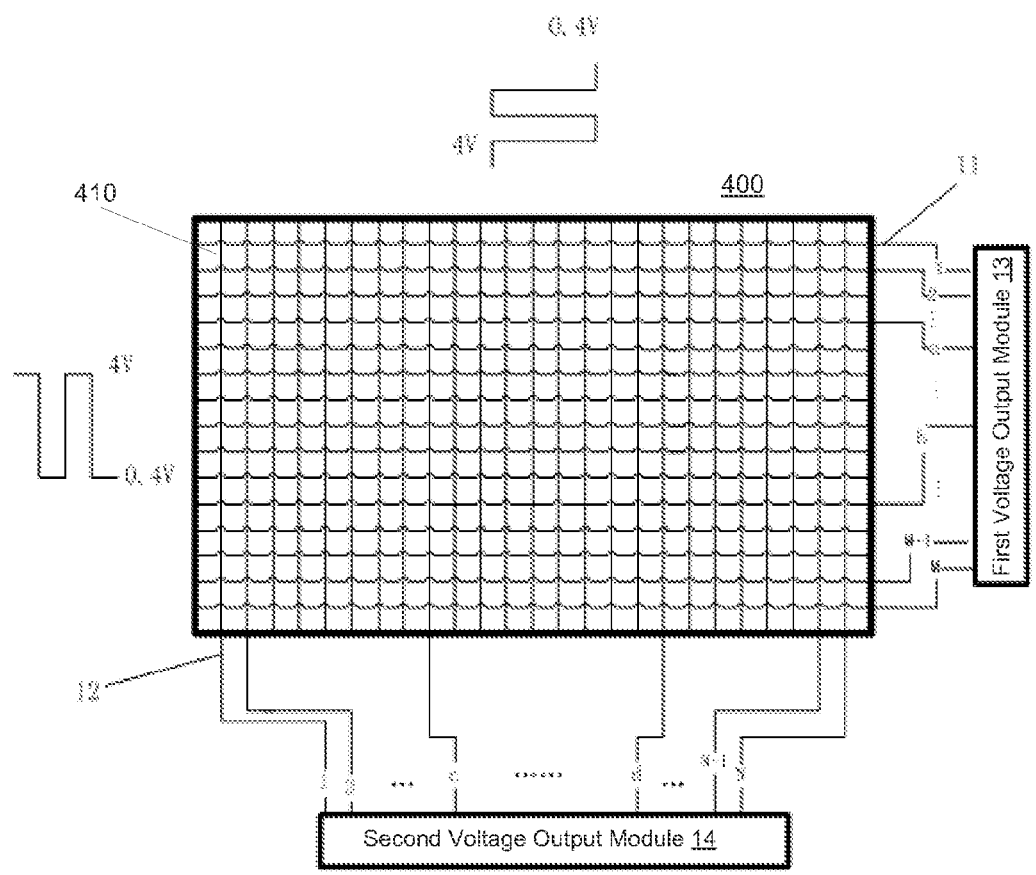
FIG. 6 illustrates another exemplary operation consistent with the disclosed embodiments.

FIG. 6 shows another exemplary operation consistent with the disclosed embodiments. The 3D display device displays only 3D images on an entire display screen, and thus may control the driving unit 30 to set 2D/3D switching device 410 for only 3D display. As shown in FIG. 6, the amplitude of the first driving voltage may have a third value (e.g., 0.4V) and a fourth value (e.g., 4.0V). The amplitude of the first driving voltage may change between the third value and the fourth value according to, for example, a pulse pattern.

Further, the amplitude of the second driving voltage may also have a third value (e.g., 0.4V) and a fourth voltage (e.g., 4.0V). The amplitude of the output voltage may change between the third value and the fourth value corresponding to the pattern of first voltage output module 13 (e.g., a pulse pattern). For example, when the first driving voltage is 0.4V, the second driving voltage is set to 4.0V; when the first driving voltage is 4.0V, the second driving voltage is set to 0.4V. Thus, a voltage difference between first electrodes 11 and second electrodes 12 can be always kept at ±3.6V. Therefore, the liquid crystal molecules in the 2D/3D switching device only have a second rotation angle such that a 3D display mode is achieved and only 3D images can be display on the entire display screen.

The first driving voltage, the second driving voltage, and the voltage difference between the first driving voltage and the second driving voltage in the 3D display mode may also be monitored. If one or both of the first driving voltage and the second driving voltage have a voltage value that is beyond a predetermined range, first adjustment signal 32 and/or second adjustment signal 33 may be provided to adjust the voltage value of the first driving voltage and the second driving voltage. Further, if one of the first driving voltage and the second driving voltage is shifted such that the voltage difference is out of an operation range, the other one of the first driving voltage and the second driving voltage may be adjusted such that the voltage difference is maintained within the operation range for 3D display.

In addition, processing module 20 may generate first adjustment signal 32 and/or second adjustment signal 33 based on 3D display contents 36 to adjust voltages from first voltage output module 13 and/or second voltage output module 14, respectively. That is, in the 3D display mode, first voltage output module 13 and second voltage output module 14 may provide various driving voltages in addition to the third value and the fourth value. For different 3D display contents, different 3D display effects may be needed. Thus, by dynamically adjusting the voltage difference between first electrodes 11 and second electrodes 12 based on various driving voltages, liquid crystal molecules may rotate in different angles to realize different degrees of 3D effects, and to improve the clarity of 3D images and to reduce grainy effects.

Figure 7:
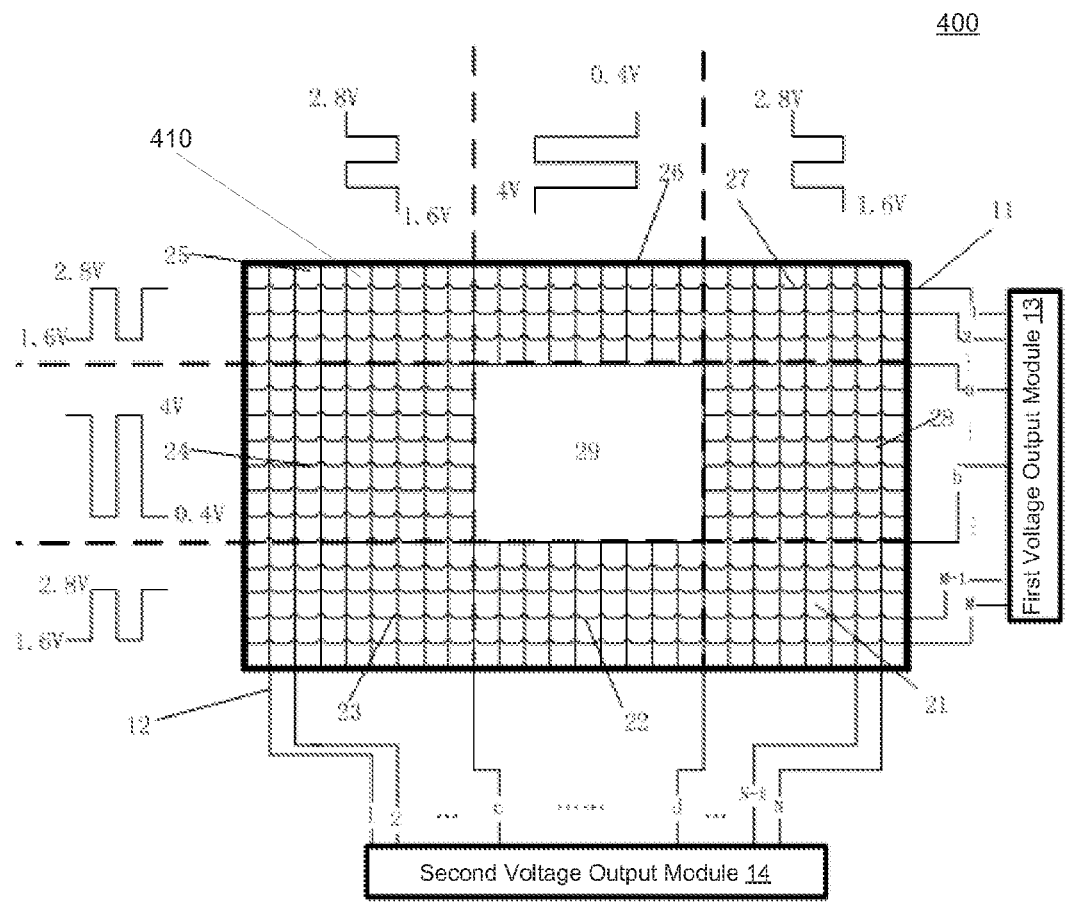
FIG. 7 illustrates another exemplary operation consistent with the disclosed embodiments.

Further, position information of 3D display areas in a display screen may also be used by processing module 20 to provide first adjustment signal 32 and/or second adjustment signal 33 based on 3D display contents 36 to adjust voltages from first voltage output module 13 and/or second voltage output module 14. For example, if a user changes the location or position of a 3D display area, voltages from first voltage output module 13 and/or second voltage output module 14 need to be adjusted accordingly. FIG. 7 shows an exemplary operation of 2D/3D switching system consistent with the disclosed embodiments.

As shown in FIG. 7, 2D/3D switching device 410 may include multiple display areas corresponding to different display areas from a 3D display device. For example, 2D/3D switching device 410 may include display areas 21, 22, 23, 24, 25, 26, 27, 28, and 29, a total of 9 display areas. First electrodes 11 and second electrodes 12 may be arranged to support these different display areas. For example, display area 29 is controlled by first electrodes a-b and second electrodes c-d. Position information of a display area may include coordinates of four corner points of the display area, or coordinates of edges of the display area.

Further, different display areas may display either 2D or 3D images. For example, display areas 21-28 may be configured to display 2D images, while display area 29 may be configured to display 3D images. First voltage output module 13 may provide a driving voltage of the third value (e.g., 0.4V) and the fourth value (e.g., 4.0V) for each of first electrodes from first electrodes a-b; while providing a driving voltage of the first value (e.g., 1.6V) and the second value (e.g., 2.8V) to each of remaining first electrodes. At the same time, second voltage output module 14 may provide a driving voltage of the third value (e.g., 0.4V) and the fourth value (e.g., 4.0V) for each of second electrodes from second electrodes c-d; while providing a driving voltage of the first value (e.g., 1.6V) and the second value (e.g., 2.8V) to each of remaining second electrodes.

Therefore, in display area 29, when the driving voltage on each of first electrodes a-b is 0.4V, the driving voltage on each of second electrodes c-d is 4.0V; and when the driving voltage on each of first electrodes a-b is 4.0V, the driving voltage on each of second electrodes c-d is 0.4V. Thus, a voltage difference of ±3.6V may be maintained between first electrodes 11 (first electrodes a-b) and second electrodes 12 (second electrodes c-d), and driving voltages from first electrodes a-b and second electrodes c-d have invert phases. The display state is therefore a 3D display mode.

For display areas 21, 23, 25, and 27, a voltage difference of ±1.2V (i.e., between the first value 1.6V and the second value 2.8V) may be maintained between first electrodes 11 and second electrodes 12. That is, when the driving voltage on each of corresponding first electrodes is 1.6V, the driving voltage on each of corresponding second electrodes is set to 2.8V, and when the driving voltage on each of corresponding first electrodes is 2.8V, the driving voltage on each of corresponding second electrodes is set to 1.6V, and also driving voltages from corresponding first electrodes and second electrodes have invert phases. Thus, the display state for display areas 21, 23, 25, and 27 is therefore a 2D display mode.

Further, for display areas 22, 24, 26, and 28, a voltage difference of ±1.2V (i.e., between the first value 1.6V and the third value 0.4V, and between the second value 2.8V and the fourth value 4.0V) may also be maintained between first electrodes 11 and second electrodes 12. That is, when the driving voltage on each of corresponding first electrodes is 1.6V, the driving voltage on each of corresponding second electrodes is set to 0.4V; when the driving voltage on each of corresponding first electrodes is 2.8V, the driving voltage on each of corresponding second electrodes is set to 4.0V; when the driving voltage on each of corresponding first electrodes is 0.4V, the driving voltage on each of corresponding second electrodes is set to 1.6V; and when the driving voltage on each of corresponding first electrodes is 4.0V, the driving voltage on each of corresponding second electrodes is set to 2.8V, and driving voltages from corresponding first electrodes and second electrodes have same phases. Thus, the display state for display areas 22, 24, 26, and 28 is also a 2D display mode.

When a user switch a display mode of a display area, for example, display area 29, processing module 20 may determine driving voltages for display area 29. Further, processing module 20 may also adjust driving voltages of other display areas, including amplitude and phase, to maintain the existing display modes of the other display areas. Such adjustment may be carried to first voltage output module 13 and/or second voltage output module 14 via first adjustment signal 32 and/or second adjustment signal 33.

When the user moves a display area (e.g., display area 29), processing module 20 may receive updated 3D display area position information 35 such that a new position for display area 29 may be determined. Further, processing module 20 may generate first adjustment signal 32 and second adjustment signal 33 and send to first voltage output module 13 and second voltage output module 14 to adjust voltage values for different display areas, as explained above. Further, processing module 20 may also adjust driving voltages of other display areas, including amplitude and phase, to maintain the existing conditions of the other display areas.

If the user changes the size of a display area (e.g., display area 29), processing module 20 may also receive updated 3D display area position information 35 such that a new position for display area 29, as well as new positions of neighboring display areas, may be determined. Further, processing module 20 may generate first adjustment signal 32 and second adjustment signal 33 and send to first voltage output module 13 and second voltage output module 14 to adjust voltage values for different display areas, as explained above.

In addition, in the various examples above, first adjustment signal 32 and second adjustment signal 33 may be from control port 19 or may be generated by processing module 20. When first adjustment signal 32 and second adjustment signal 33 are generated by processing module 20, processing module 20 may obtain 3D display area position information 35, 3D display contents 36, or voltage offset 37 from control port 19, process these information, and generate appropriate voltage adjustments to first voltage output module 13 and second voltage output module 14.

Figure 8:
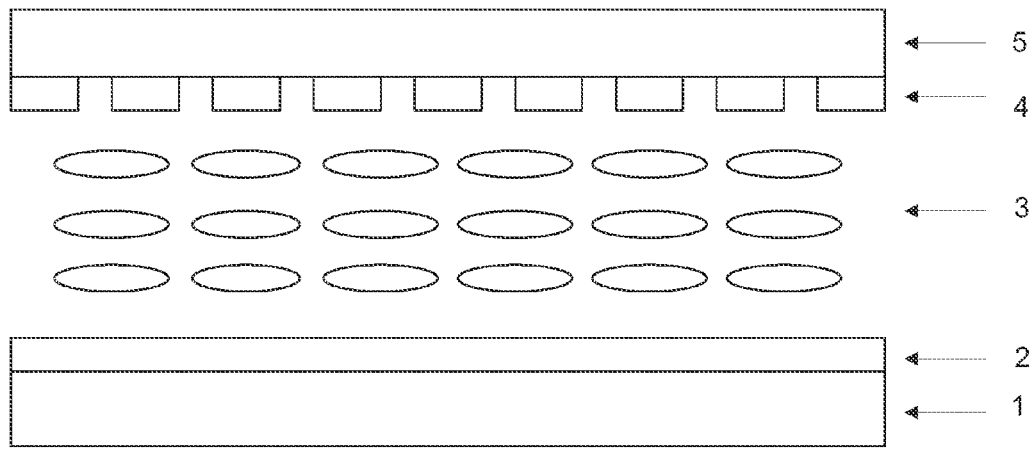
FIG. 8 illustrates an exemplary 2D/3D display device in a 2D mode consistent with the disclosed embodiments.

Similar other types of display devices and driving mechanisms may be used to implement 2D/3D display switching consistent with the disclosed embodiments. FIG. 8 illustrates an exemplary 2D/3D display device in a 2D mode. As shown in FIG. 8, 2D/3D display device 800 includes a first substrate 81, a second substrate 85, a first electrode layer 82, a second electrode layer 84, and a liquid crystal layer 83. Other components may also be included.

The first substrate 81 and the second substrate 85 may include any appropriate type of substrates, such as glass substrates. The first electrode layer 82 and the second electrode layer 84 may be formed on the first substrate 81 and the second substrate 85, respectively. As previously described, the first electrode layer 82 may include a plurality of first stripe or wire electrodes arranged in parallel with a certain distance, and the second electrode layer 84 may also a plurality of second stripe or wire electrodes arranged in parallel with a certain distance. Further, the second electrodes may be positioned perpendicular to each other (i.e., crossing each other) to form electric fields.

The liquid crystal 83 may be formed between the first electrodes and the second electrodes. The liquid crystal 83 may include any appropriate type of liquid crystal, such as a twisted nematic (TN) liquid crystal. Alignment layers (not shown) may also be formed on the electrode layers to manage liquid crystal alignment directions.

The liquid crystal 83 may have various appropriate characteristics of a liquid crystal for a displaying device. For example, liquid crystal 83 may have a threshold voltage and a saturation voltage. When the liquid crystal 83 is applied with a driving voltage that is below the threshold voltage or above the saturation voltage, there is no change in its optical response to light transmitting through the liquid crystal 83.

As shown in FIG. 8, a first voltage difference is uniformly applied between the first electrodes and the second electrodes and the first voltage difference is less than a threshold voltage of the liquid crystal. The liquid crystal molecules may be maintained with the long axis having the normal direction, which is parallel to the first and second substrates. The display device is in a full-screen 2D mode.

Figure 9:
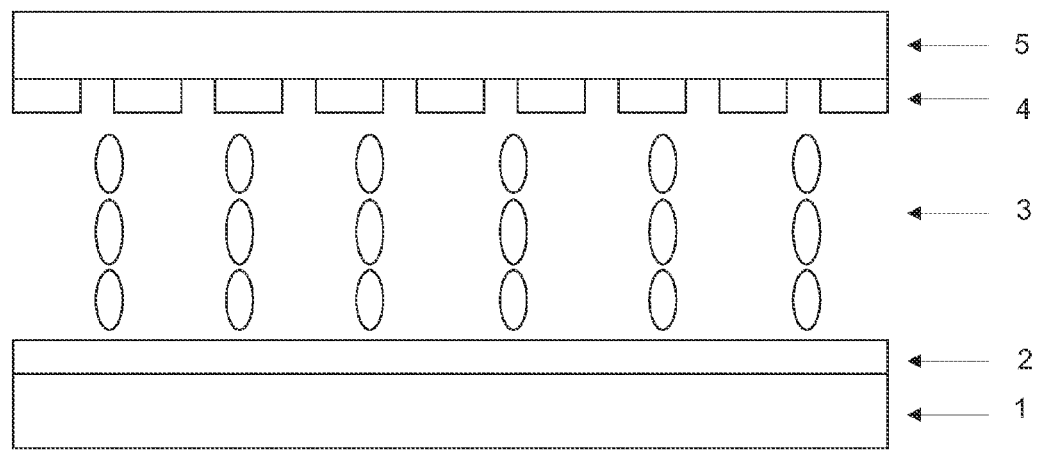
FIG. 9 illustrates an exemplary 2D/3D display device in a 2D mode consistent with the disclosed embodiments.

FIG. 9 illustrates the 2D/3D display device 800 in another 2D display mode. As shown in FIG. 9, a second voltage difference is also uniformly applied between the first electrodes and the second electrodes and the second voltage difference is greater than the saturation voltage of the liquid crystal 83.

Because the second voltage is over the saturation voltage, the long axis of liquid crystal molecules may be rotated within the same horizontal plane, but still maintain parallel to the first and second substrates. Thus, the liquid crystal layer 83 does not change the polarization direction of the entering lights. The display device is also in a full-screen 2D mode.

Figure 10:
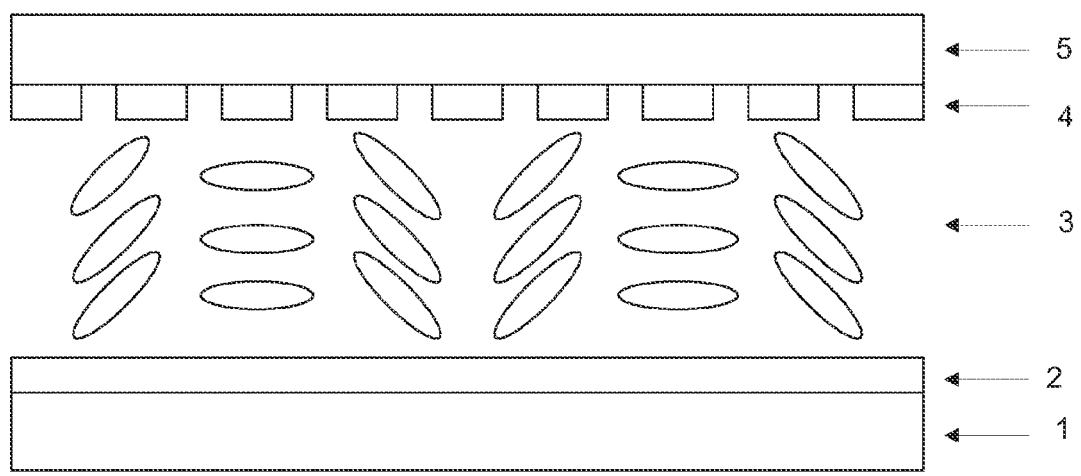
FIG. 10 illustrates an exemplary 2D/3D display device in a 3D mode consistent with the disclosed embodiments.

FIG. 10 illustrates the 2D/3D display device 800 in a 3D display mode. As shown in FIG. 10, the first electrodes and the second electrodes are arranged into groups or units, with each group or unit having a plurality of first electrodes and the second electrodes. Further, various voltage differences are applied between the first electrodes and the second electrodes for each group or unit such that the liquid crystal layer 83 form a lens.

More specifically, the various voltage differences are greater than or equal to the threshold voltage of the liquid crystal 83 but less than or equal to the saturation voltage of the liquid crystal 83. Thus, various voltage differences applied on the first electrodes and the second electrodes cause the long axis of liquid crystal molecules to rotate and to be arranged along the direction of the electric field between the first electrodes and the second electrodes. Further, because the various voltage differences are not equal, the degrees of rotation of the long axis of the liquid crystal molecules are also different.

In certain embodiments, the various voltage differences are arranged as a 'U' shape, i.e., the voltage difference on the outer sides of the electrode group is the highest and becomes lower toward to the center of the electrode group. Under the 'U' shape voltage differences, the rotation of the long axis of the liquid crystal molecules can be configured in gradient so as to form a lens unit, as shown in FIG. 10. Thus, a liquid crystal gradient lens unit may be formed for the electrode group. The liquid crystal 83 may then be configured into an array of lens units to cause the display device to operate in a full-screen 3D mode.

Thus, a liquid crystal lens unit is formed by a certain number of first electrodes and a certain number of second electrodes having the various voltage differences, e.g., in a 'U' shape. The width of the lens unit may be controlled by the number of the second electrodes forming the lens unit, while the number of the first electrodes may control the length of the lens unit. For example, when all the first electrodes are used, the lens unit is a cylindrical lens unit across the display device by the entire height. Further, the shape of the lens unit (e.g., the focal length of the lens unit) may be controlled by the value of voltage differences between the first electrodes and the second electrodes.

Any appropriate number of the first electrodes and the number of second electrodes may be used. For example, 5 second electrodes may be used to form a lens unit by the liquid crystal at the intersection of the 5 second electrodes and the second electrodes, such that the width of the lens unit is determined by the 5 second electrodes and the shape of the lens unit is determined by the 'U' shaped values of the various voltage differences on the 5 second electrodes and the second electrodes. After the arrays of lens units are formed, the display device can operate in the 3D mode.

Figure 11:
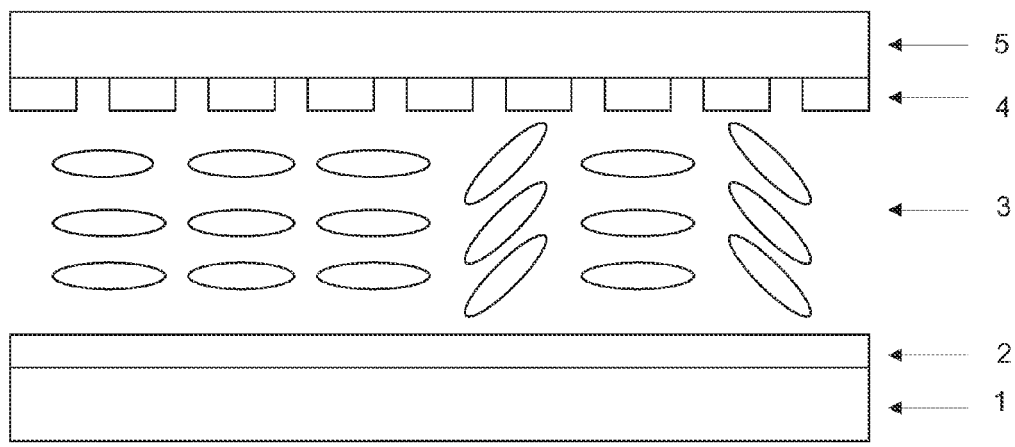
FIG. 11 illustrates an exemplary 2D/3D display device in a 2D/3D mode consistent with the disclosed embodiments.

Further, because each electrode of the first electrodes and the second electrodes can be individually controlled (i.e., driven), different regions of the liquid crystal layer 83 can be controlled to operate in the 2D mode or the 3D mode at the same time in different regions. FIG. 11 illustrates the 2D/3D display device 800 in a 2D/3D display mode.

As shown in FIG. 11, the first voltage difference is applied between the first electrodes and the second electrodes within a first region of the display device, such that the first region of the display device operates in the 2D mode, as in FIG. 8, i.e., the first voltage difference is less than the threshold voltage of the liquid crystal.

At the same time, the various voltage differences are applied between the first electrodes and the second electrodes within a second region of the display device, such that the right region of the display device operates in the 3D mode, as in FIG. 10, i.e., the various voltage differences are greater than or equal to the threshold voltage of the liquid crystal 83 but less than or equal to the saturation voltage of the liquid crystal 83, and are arranged in a 'U' gradient shape.

Figure 12:
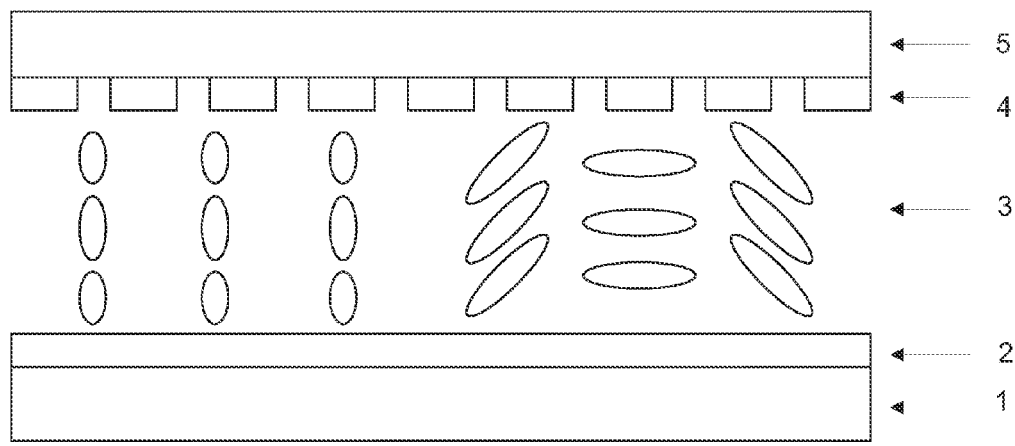
FIG. 12 illustrates an exemplary 2D/3D display device in a 2D/3D mode consistent with the disclosed embodiments.

FIG. 12 illustrates the 2D/3D display device 800 in another 2D/3D display mode. As shown in FIG. 12, the second voltage difference is applied between the first electrodes and the second electrodes within a first region of the display device, such that the first region of the display device operates in the 2D mode as in FIG. 9, i.e., the second voltage difference is greater than the saturation voltage of the liquid crystal.

At the same time, the various voltage differences are applied between the first electrodes and the second electrodes within a second region of the display device, such that the second region of the display device operates in the 3D mode, as in FIG. 10, i.e., the various voltage differences are greater than or equal to the threshold voltage of the liquid crystal 83 but less than or equal to the saturation voltage of the liquid crystal 83, and are arranged in a 'U' gradient shape.

Figure 13:
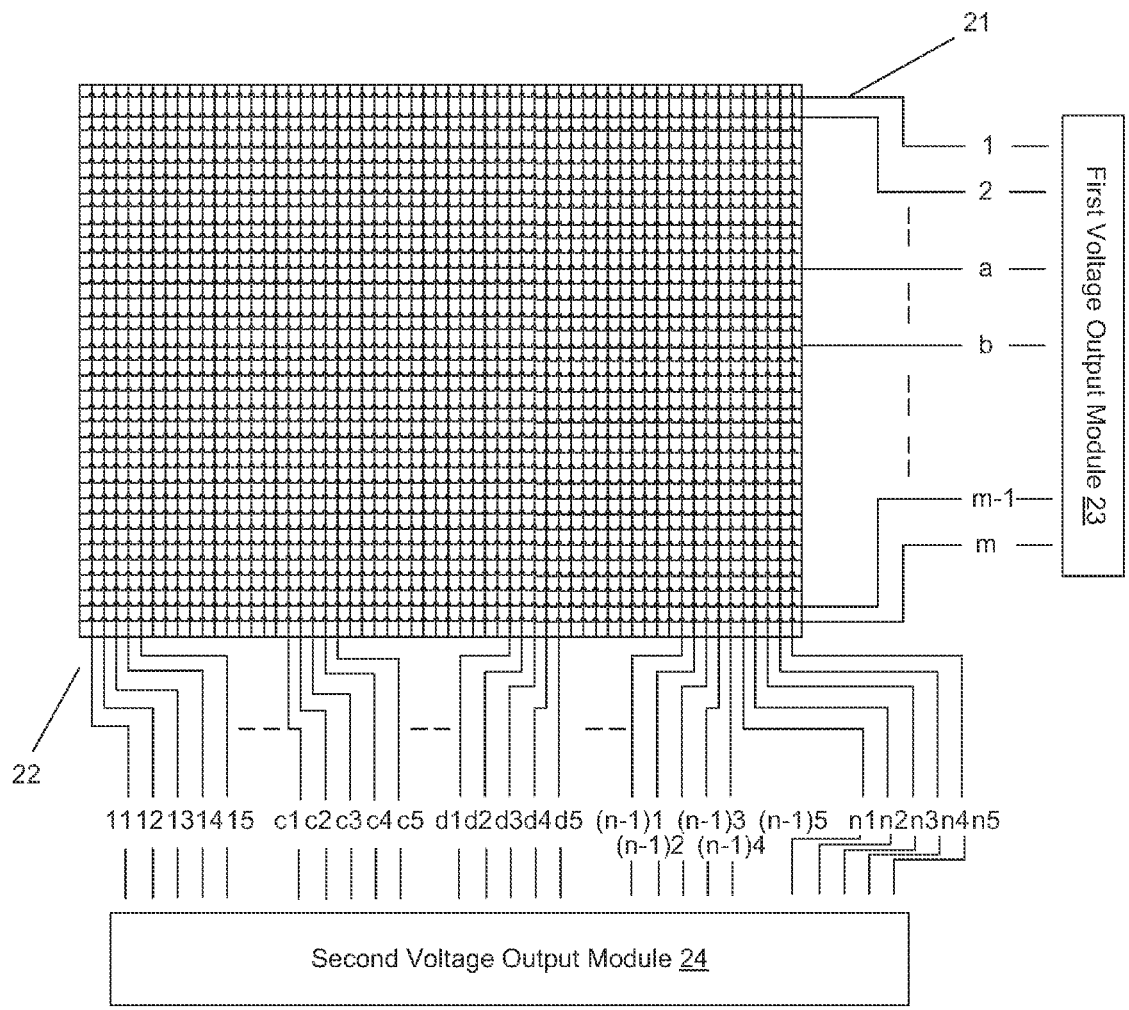
FIG. 13 illustrates an implementation of an exemplary 2D/3D display device in a 2D mode consistent with the disclosed embodiments.

FIG. 13 illustrates an implementation of the 2D/3D display device 800 in the full-screen 2D mode. As shown in FIG. 13, the second electrodes 22 are grouped by 5. That is, 5 second electrodes (as an example) are used to form the liquid crystal lens unit if needed. Thus, the second electrodes are arranged by consecutive five second electrodes. Specifically, the second electrodes include (11, 12, 13, 14, 15), . . . (c1, c2, c3, c4, c5), . . . (d1, d2, d3, d4, d5), . . . ((n01)1, (n−1)2, (n−1_3, (n−1)4, (n−1)5), (n1, n2, n3, n4, n5). A total number of m number of first electrodes are arranged correspondingly, 1, 2, . . . , a, b, . . . (m−1), m, where m is an integer. In certain embodiments, the five second electrodes corresponding to a second electrode may form a lens unit.

Further, the first voltage output module 23 provides driving voltages for individual first electrodes 21, and the second voltage output module 24 provides driving voltages for individual second electrodes 22.

As shown in FIG. 13, a voltage U1 is applied on all first electrodes, and a voltage U2 is applied on all second electrodes. The voltage U1 and voltage U2 are controlled to satisfy |U2−U1|<=Uth, where Uth is the threshold voltage of the liquid crystal layer. For example, U1=U2=0V, and because no voltage is applied on the first electrodes and the second electrodes, i.e., the first voltage difference is 0. Thus, the display device is in the full-screen 2D mode, as indicated in FIG. 8.

Figure 14:
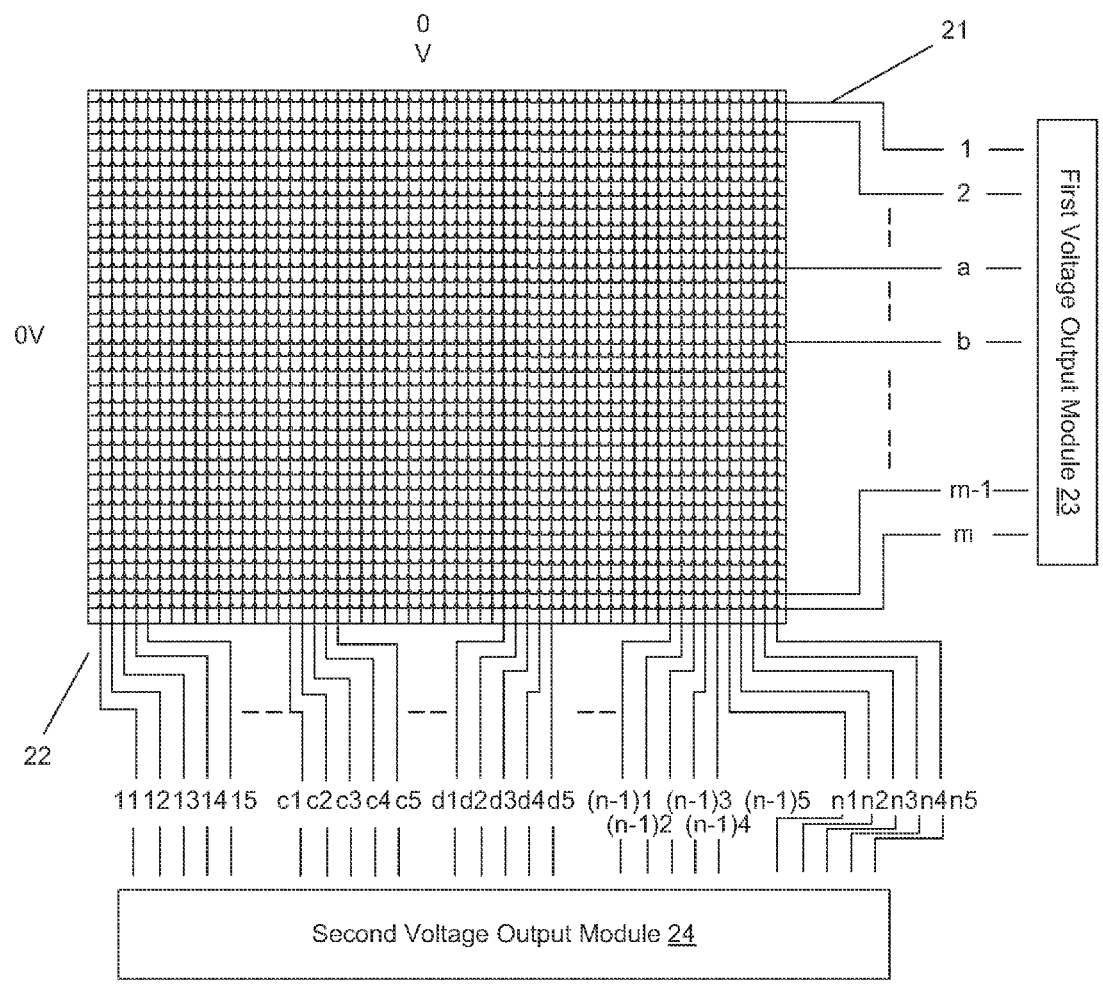
FIG. 14 illustrates an implementation of an exemplary 2D/3D display device in a 2D mode consistent with the disclosed embodiments.

FIG. 14 illustrates another implementation of the 2D/3D display device 800 in the full-screen 2D mode. As shown in FIG. 14, a voltage U3 is applied on all first electrodes, and a voltage U4 is applied on all second electrodes. The voltage U1 and voltage U2 are controlled to satisfy |U3−U4|>=Us, where Us is the saturation voltage of the liquid crystal layer. For example, U3 may be a periodic square wave voltage from −10V to +10V, and U4=0V. Because the voltage difference between the first electrodes and the second electrodes (i.e., 10V) are greater than the saturation voltage of the liquid crystal, the display device is in the full-screen 2D mode, as indicated in FIG. 9.

Figure 15:
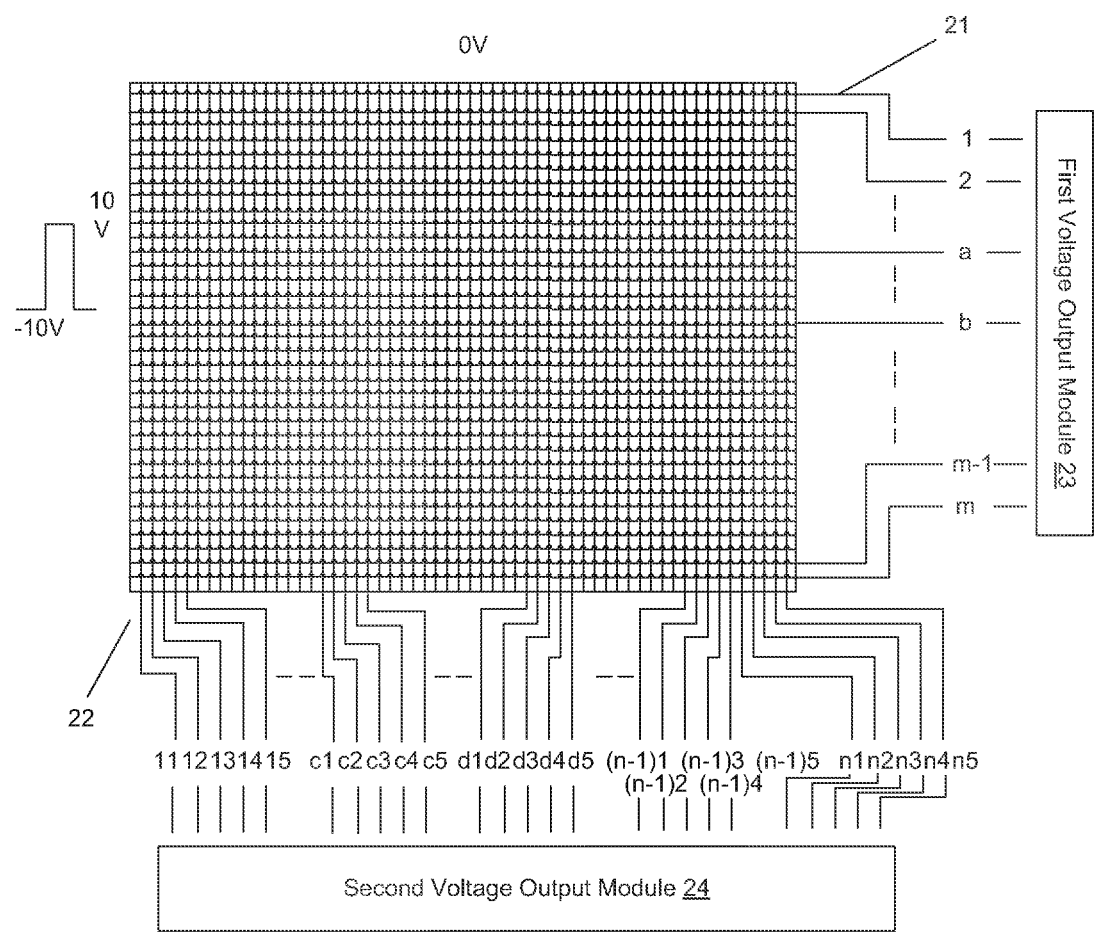
FIG. 15 illustrates an implementation of an exemplary 2D/3D display device in a 3D mode consistent with the disclosed embodiments.

FIG. 15 illustrates an implementation of the 2D/3D display device 800 in the full-screen 3D mode. As shown in FIG. 15, a voltage U5 is applied on all first electrodes, and various voltages U6 are applied on individual second electrodes in each electrode group, according to Un1, Un2, Un3, Un4, Un5 on the 5 electrodes (n1n2n3n4n5) in each electrode group for the second electrodes. The various voltages are arranged as |Un1|>|Un2|>|Un3|, and |Un5|>|Un4|>|Un3|, such that the absolute values of the various voltages value into a "U" shaped segments.

Further, the various voltages U6 and the voltage U5 may be controlled to satisfy |Un1−U5|>|Un2−U5|>|Un3−U5|>=0, and |Un5−U5|>|Un4−U5|>|Un3−U5|>=0, and |Un1−U5|>=Uth, |Un5−U5|>=Uth. The voltage relationship among the various voltages may be arranged to be symmetric or approximately symmetric with respect to the electrode n3, such that the gradient electric field between the first electrodes and the second electrodes can cause change different rotations of the liquid crystal molecules to format a gradient lens unit, as in FIG. 10.

For example, in one embodiment, U5=0V, and the various voltages may be configured as: Un1=Un5>Uth, Un2=Un4, and |Un1|>|Un2|>|Un3|, wherein Un1=Un5 being a periodic square wave voltage from −5V to +5V; Un1=Un5 being a periodic square wave voltage from −5V to +5V; Un2=Un4 being a periodic square wave voltage from −3V to +3V; and Un3 is a periodic square wave voltage from −1V to +1V. The display device is in the full-screen 3D mode, as indicated in FIG. 10.

Figure 16:
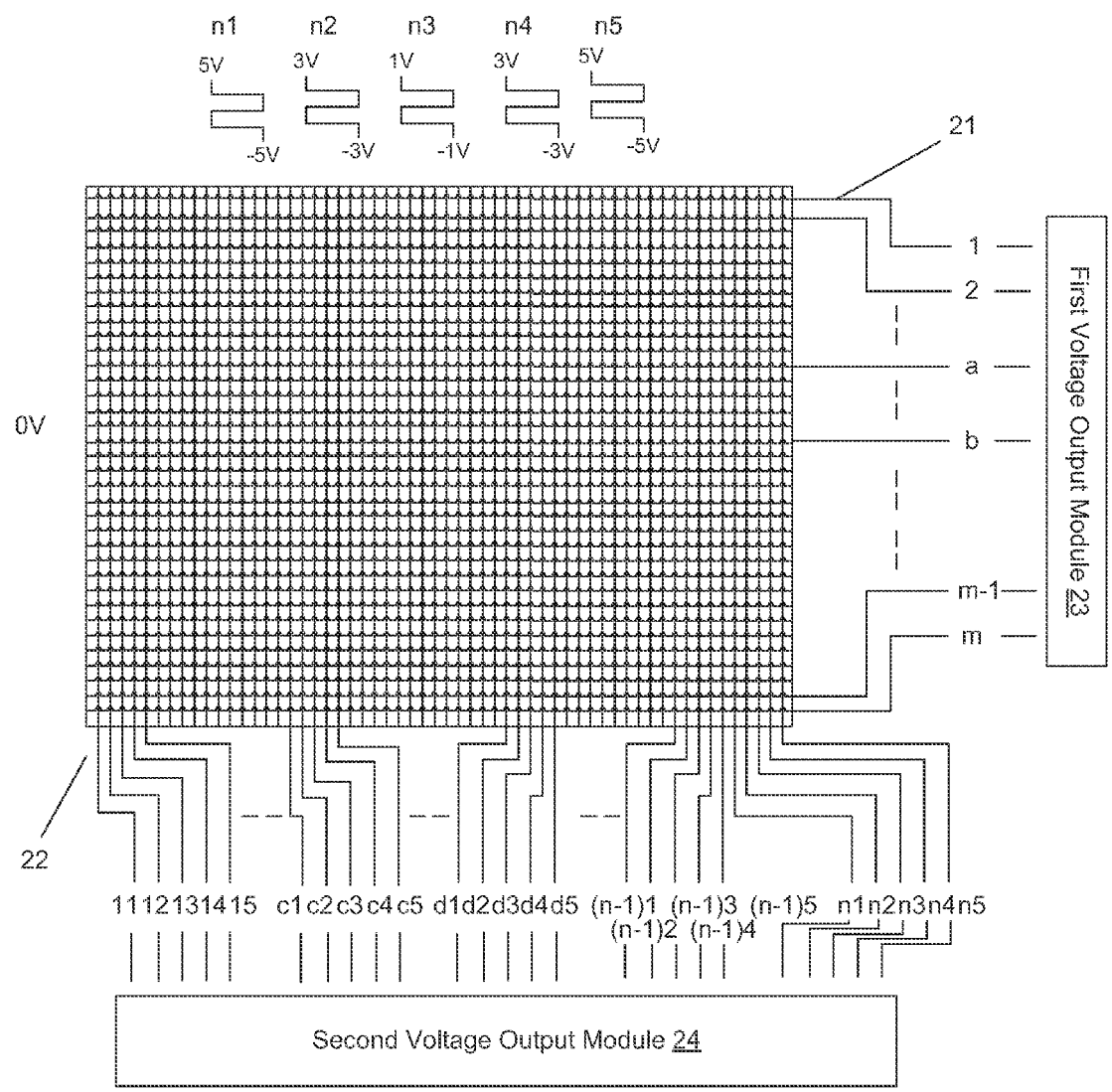
FIG. 16 illustrates an implementation of an exemplary 2D/3D display device in a 2D/3D mode consistent with the disclosed embodiments.

FIG. 16 illustrates an implementation of the 2D/3D display device 800 in the 2D/3D mode. As shown in FIG. 16, the entire display area is separated into different display regions 31, 32, 33, 34, 35, 36, 37, 38, and 39. Other configurations may also be used. Among the various display regions, region 39 is configured as a 3D display region, while the remaining display regions are configured as 2D display regions.

The 3D display region 39 may be formed by all first electrodes a . . . b, and all second electrodes c1c2c3c4c5 . . . d1d2d3d4d5. The voltages applied on the display region 39 may be similar to FIG. 15 above. Specifically, the relationship among the various voltages Up1, Up2, Up3, Up4, and Up5 on the second electrodes and between the various voltages and the voltage U5 applied on the first electrodes may be provided as: |Up1|>|Up2|>|Up3|, |Up5|>|Up4|>|Up3|, and |Up1−U5|>|Up2−U5|>|Up3−U5|>=0, |Up5−U5|>|Up4−U5|>|Up3−U5|>=0, |Up1−U5|>Uth, |Up5−U5|>Uth (assuming all of the first electrodes a . . . b are applied with voltage U5).

Other display regions 31, 32, 33, 34, 35, 36, 37, and 38 are 2D display regions. For display regions 31, 33, 35, and 37, no voltage is applied on the second electrodes, while a periodic square wave of voltage −10V and +10V is applied on the first electrodes. Thus, the voltage difference between the first electrodes and the second electrodes within these display regions are greater than the saturation voltage of the liquid crystal, providing the 2D mode in display regions 31, 33, 35, and 37.

For the display regions 32 and 36, the various voltages Up1, Up2, Up3, Up4, and Up5 are applied on each group of electrodes (p1p2p3p4p5) of the second electrodes, while the periodic square wave of voltage −10V and +10V is applied on the first electrodes. The voltage difference between the first electrodes and the second electrodes within these display regions are still greater than the saturation voltage of the liquid crystal, providing the 2D mode in display regions 32 and 36.

For the display regions 34 and 38, no voltage is applied on the second electrodes within these regions, and no voltage is applied on the first electrodes within these regions. Thus, the voltage difference between the first electrodes and the second electrodes within these display regions are less than the threshold voltage of the liquid crystal, providing the 2D mode in display regions 34 and 38. Other voltage values may also be used as long as the first and second voltage differences can be achieved to control the 2D/3D mode in the various display regions.

In other words, the various voltage differences are applied between the first electrodes and the second electrodes within the 3D display region in the 3D mode, while the voltage differences applied between the first electrodes and the second electrodes within any 2D display region satisfy the 2D mode operation conditions, i.e., the voltage difference between the first electrodes and the second electrodes within the 2D display region is either greater than the saturation voltage of the liquid crystal layer or less than the threshold voltage of the liquid crystal layer.

Figure 17:
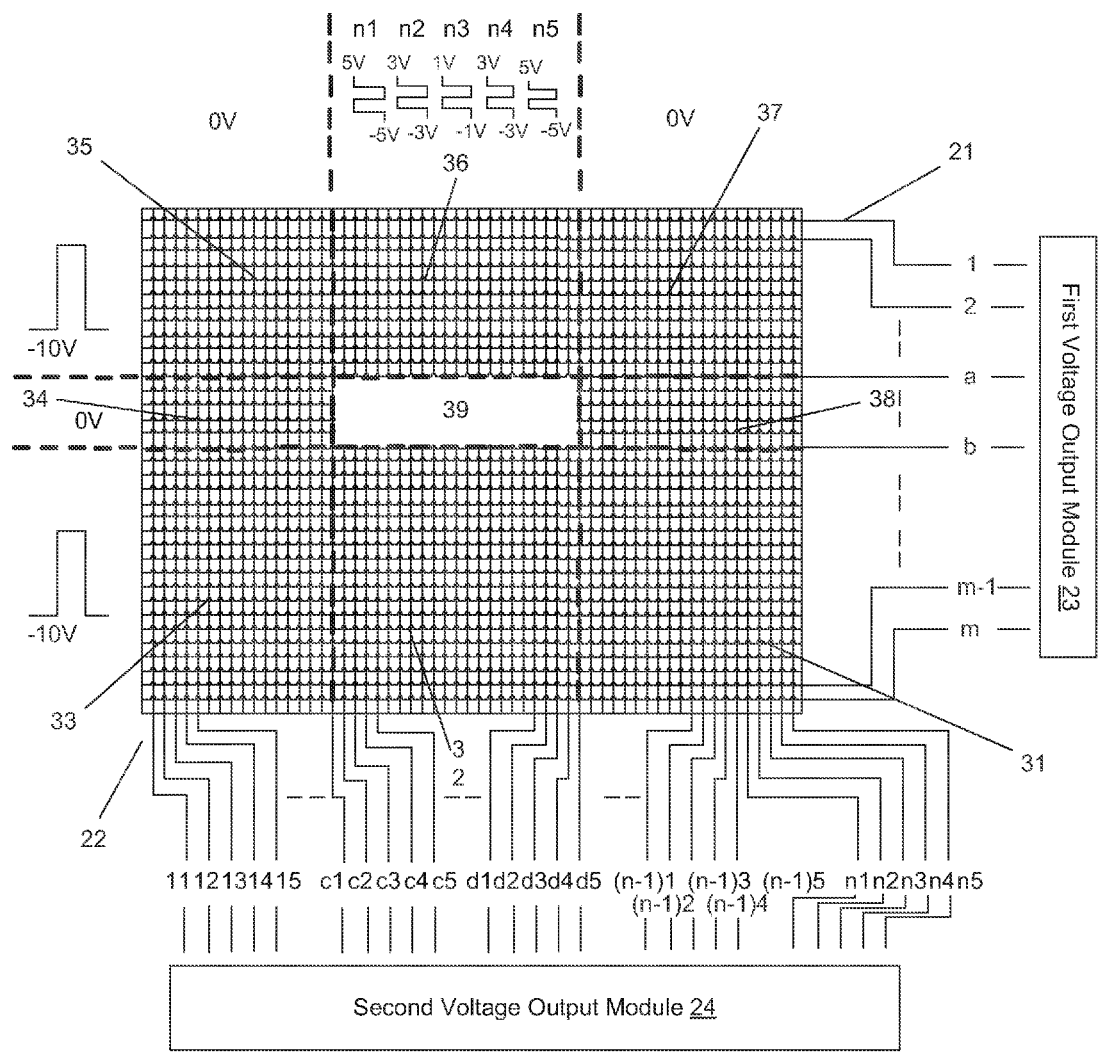
FIG. 17 illustrates an implementation of an exemplary 2D/3D display device in a 2D/3D mode consistent with the disclosed embodiments.

FIG. 17 illustrates another implementation of the 2D/3D display device 800 in the 2D/3D mode. As shown in FIG. 17, the entire display area is separated into different display regions 41, 42, 43, 44, 45, 46, 47, 48, and 49. Other configurations may also be used. Among the various display regions, region 49 is configured as a 3D display region, while the remaining display regions are configured as 2D display regions.

The 3D display region 49 may be formed by all first electrodes a . . . b, and all second electrodes c1c2c3c4c5 . . . d1d2d3d4d5. The voltages applied on the display region 49 may be similar to FIG. 15 above. Specifically, a voltage U5 is applied on the first electrodes, and the various voltages on the second electrodes are periodic square wave voltages of −|Up1| and +|Up1|, −|Up2| and +|Up2|, −|Up3| and +|Up3|, −|Up4| and +|Up4|, and −|Up5| and +|Up5|. The relationship among the various voltages Up1, Up2, Up3, Up4, and Up5 on the second electrodes and between the various voltages and the voltage U5 applied on the first electrodes may be provided as: |Up1|>|Up2|>|Up3|, |Up5|>|Up4|>|Up3|, and |Up1−U5|>|Up2−U5|>|Up3−U5|>=0, |Up5−U5|>|Up4−U5|>|Up3−U5|>=0, |Up1−U5|>Uth, |Up5−U5|>Uth (assuming voltage U5 applied on all of the first electrodes a . . . b). Thus, the various voltage differences between the first electrodes and the second electrodes within the display region 49 may be greater than or equal to the threshold voltage but less than or equal to the saturation voltage, and the display region 49 is in the 3D mode.

Other display regions 41, 42, 43, 44, 45, 46, 47, and 48 are 2D display regions. For display region 41, a periodic square wave voltage of −|U10| and +|U10| is applied on the second electrodes and a periodic square wave voltage of −|U7| and +|U7| is applied on the first electrodes, and |U10−U7|<=Uth. That is, the voltage difference between the first electrodes and the second electrodes is less than the threshold voltage of the liquid crystal layer. Thus, display region 41 is in a 2D display mode.

For the display region 42, the various periodic square wave voltages of −|Up1| and +|Up1|, −|Up2| and +|Up2|, −|Up3| and +|Up3|, −|Up4| and +|Up4|, and −|Up5| and +|Up5| are applied on the second electrodes and a periodic square wave voltage of −|U7| and +|U7| is applied on the second electrodes. Further, |Up1−U7|<=Uth, |Up2−U7|<=Uth, |Up3−U7|<=Uth, |Up4−U7|<=Uth, and |Up5−U7|<=Uth. That is, the voltage difference between the first electrodes and the second electrodes is less than the threshold voltage of the liquid crystal layer. Thus, display region 42 is also in a 2D display mode.

For the display region 43, a periodic square wave voltage of −|U8| and +|U8| is applied on the second electrodes and a periodic square wave voltage of −|U7| and +|U7| is applied on the first electrodes, and |U8−U7|<=Uth. That is, the voltage difference between the first electrodes and the second electrodes is less than the threshold voltage of the liquid crystal layer. Thus, the display region 43 is in a 2D display mode.

For the display region 44, voltage U5 is applied on the first electrodes, while a periodic square wave of voltage −|U8| and +|U8| is applied on the second electrodes, and |U8−U5|<=Uth. That is, the voltage difference between the first electrodes and the second electrodes is less than the threshold voltage of the liquid crystal layer. Thus, the display region 44 is in a 2D display mode.

For the display region 45, a periodic square wave of voltage −|U8| and +|U8| is applied on the second electrodes and a periodic square wave of voltage −|U9| and +|U9| is applied on the first electrodes, and |U8−U9|<=Uth. That is, the voltage difference between the first electrodes and the second electrodes is less than the threshold voltage of the liquid crystal layer. Thus, the display region 45 is in a 2D display mode.

For display region 46, the various periodic square wave voltages of −|Up1| and +|Up1|, −|Up2| and +|Up2|, −|Up3| and +|Up3|, −|Up4| and +|Up4|, and −|Up5| and +|Up5| are applied on the second electrodes and a periodic square wave voltage of −|U9| and +|U9| is applied on the first electrodes. Further, |Up1−U9|<=Uth, |Up2−U9|<=Uth, |Up3−U9|<=Uth, |Up4−U9|<=Uth, and |Up5−U9|<=Uth. That is, the voltage difference between the first electrodes and the second electrodes is less than the threshold voltage of the liquid crystal layer. Thus, display region 46 is also in a 2D display mode.

For display region 47, a periodic square wave voltage of −|U10| and +|U10| is applied on the second electrodes and a periodic square wave voltage of −|U9| and +|U9| is applied on the first electrodes, and |U10−U9|<=Uth. That is, the voltage difference between the first electrodes and the second electrodes is less than the threshold voltage of the liquid crystal layer. Thus, display region 47 is in a 2D display mode.

For display region 48, voltage U5 is applied on the first electrodes, while a periodic square wave voltage of −|U10| and +|U10| is applied on the second electrodes, and |U10−U5|<=Uth. Thus, the voltage difference between the first electrodes and the second electrodes within these display regions are greater than the saturation voltage of the liquid crystal, providing the 2D mode in display region 48.

Although a total of 5 second electrodes are used to illustrate the gradient liquid crystal lens for 3D display, any other appropriate number of second electrodes may be used. For example, a total of 3, 4, or 7 second electrodes may be used to form the lens unit under the 'U' shape driving voltages.

By using the disclosed methods and systems, 3D display areas may be changed upon a user's request, and interferences between 2D display areas and 3D display areas may be avoided. Also, it is understood that the various voltage values used in this disclosure are for illustrative purposes. For example, an arithmetic series of voltages (i.e., a series voltages with same interval between two neighboring voltages) may be provided. Any appropriate voltages values may be used.

What is claimed is:
1. A 2D/3D switching system, comprising:
   a 2D/3D switching device having a display area for selectively processing lights from 2D images and 3D images, including:
      a first substrate;
      a plurality of first electrodes formed on the first substrate;
      a second substrate;
      a plurality of second electrodes formed on the second substrate and arranged corresponding to the plurality of first electrodes and separated with a distance;
      a liquid crystal layer placed between the first substrate having the plurality of first electrodes and the second substrate having the plurality of second electrodes to provide the display area; and
   a driving unit coupled to the plurality of first electrodes and the plurality of second electrodes to provide driving voltages to the plurality of first electrodes and the plurality of second electrodes,
   wherein the second electrodes are arranged into a plurality of groups and the driving unit applies one or more voltages on the first electrodes and the second electrodes to enable the liquid crystal layer to operate in one of a full-screen 2D mode, a full-screen 3D mode, and a 2D/3D mode;
   wherein, in the 2D/3D mode, various driving voltages are applied on each of the plurality of groups of the second electrodes associated with a 3D display window, a uniform driving voltage is applied on each of the plurality of groups the second electrodes associated with a 2D display window; a first driving voltage is applied on first electrodes associated with the 3D display window; and a second driving voltage is applied on first electrodes associated with the 2D display window; and
   wherein difference between the uniform driving voltage and the first driving voltage is below a threshold voltage of the liquid crystal; difference between the uniform driving voltage and the second driving voltage is above a saturation voltage of the liquid crystal; difference between the various driving voltages and the first driving voltage is between the threshold voltage and the saturation voltage; and difference between the various driving voltages and the second driving voltage is above the saturation voltage.
2. The 2D/3D switching system according to claim 1, wherein:

in the full-screen 2D mode, the uniform driving voltage is applied to all second electrodes and the second driving voltage is applied to all first electrodes.

3. The 2D/3D switching system according to claim 1, wherein:
in the full-screen 3D mode, the various driving voltages are applied on each of the plurality of groups of all second electrodes and the first driving voltage is applied to all first electrodes.

4. The 2D/3D switching system according to claim 3, wherein:
the various driving voltages are greater than or equal to the threshold voltage but less than or equal to the saturation voltage.

5. The 2D/3D switching system according to claim 4, wherein:
a total number of electrodes in a group of second electrodes determine a width of a liquid crystal lens unit controlled by the group of second electrodes.

6. The 2D/3D switching system according to claim 1, wherein:
the various driving voltages are arranged in a 'U' shape gradient, with voltage being the largest on outer electrodes of the lens unit and becoming smaller towards center electrodes of the lens unit.

7. The 2D/3D switching system according to claim 6, wherein:
the total number of electrodes in a group of the second electrodes is five.

8. A method for a 2D/3D switching device for selectively processing lights from 2D images and 3D images, the 2D/3D switching device having a first substrate, a plurality of first electrodes formed on the first substrate, a second substrate, a plurality of second electrodes formed on the second substrate and arranged corresponding to the plurality of first electrodes and separated with a distance, and a liquid crystal layer placed between the first substrate having the plurality of first electrodes and the second substrate having the plurality of second electrodes to provide a display area, the method comprising:
individually providing driving voltages to the plurality of first electrodes and the plurality of second electrodes arranged into a plurality of groups of second electrodes; and
applying one or more voltages on the first electrodes and the second electrodes to enable the liquid crystal layer to operate in one of a full-screen 2D mode, a full-screen 3D mode, and a 2D/3D mode;

wherein, in the 2D/3D mode, various driving voltages are applied on each of the plurality of groups of the second electrodes associated with a 3D display window, a uniform driving voltage is applied on each of the plurality of groups the second electrodes associated with a 2D display window; a first driving voltage is applied on first electrodes associated with the 3D display window; and a second driving voltage is applied on first electrodes associated with the 2D display window; and
wherein difference between the uniform driving voltage and the first driving voltage is below a threshold voltage of the liquid crystal; difference between the uniform driving voltage and the second driving voltage is above a saturation voltage of the liquid crystal; difference between the various driving voltages and the first driving voltage is between the threshold voltage and the saturation voltage; and difference between the various driving voltages and the second driving voltage is above the saturation voltage.

9. The method according to claim 8, wherein applying one or more voltages in the full-screen 2D mode further includes:
in the full-screen 2D mode, applying the uniform driving voltage to all second electrodes and applying the second driving voltage to all first electrodes.

10. The method according to claim 9, wherein applying one or more voltages in the full-screen 3D mode further includes:
in the full-screen 3D mode, applying the various driving voltages on each of the plurality of groups of all second electrodes and applying the first driving voltage to all first electrodes.

11. The method according to claim 10, wherein:
the various driving voltages are greater than or equal to the threshold voltage but less than or equal to the saturation voltage.

12. The method according to claim 11, wherein:
a total number of electrodes in a group of second electrodes determine a width of a liquid crystal lens unit controlled by the group of second electrodes.

13. The method according to claim 11, wherein:
the various driving voltages are arranged in a 'U' shape gradient, with voltage being the largest on outer electrodes of the lens unit and becoming smaller towards center electrodes of the lens unit.

* * * * *